United States Patent [19]
Jin

[11] Patent Number: 6,031,066
[45] Date of Patent: Feb. 29, 2000

[54] PROCESS FOR PRODUCING α, β-UNSATURATED CARBOXYLIC ACID ESTER POLYMER

[75] Inventor: Ren-Hua Jin, Tokyo, Japan

[73] Assignee: Dainippon Ink and Chemicals, Inc., Tokyo, Japan

[21] Appl. No.: 09/246,158

[22] Filed: Feb. 8, 1999

[30] Foreign Application Priority Data

Feb. 9, 1998 [JP] Japan .................................. 10-027194

[51] Int. Cl.⁷ .................................................. C08G 63/02
[52] U.S. Cl. ........................................ 528/272; 528/271
[58] Field of Search ..................................... 528/271, 272

[56] References Cited

FOREIGN PATENT DOCUMENTS 53-37791  4/1978  Japan .
8-259615  10/1996  Japan .

OTHER PUBLICATIONS

Kuroki et al., "Polymer Preprints", The Society of Polymer Science, Japan, vol. 37, No. 6, pp. 1327–1329 (1988).
Sogah et al., "Group Transfer Polymerization. Polymerization of Acrylic Monomers", Macromolecules, 1987, vol. 20, pp. 1473–1488.

Primary Examiner—Terressa Mosley-Boykin
Attorney, Agent, or Firm—Armstrong, Westerman, Hattori, McLeland & Naughton

[57] ABSTRACT

An object is: to provide a novel, generally applicable polymerization initiator which can be prepared easily and which is highly stable, for application to the production of polymers and block copolymers of α,β-unsaturated carboxylic acid esters; to polymerize α,β-unsaturated carboxylic acid esters using the polymerization initiator; and to provide a novel, generally applicable production process for polymers and block copolymers of α,β-unsaturated carboxylic acid esters having high molecular weight and little discoloration, by which active hydrogen-containing monomers can be polymerized. This is achieved by a novel production process involving polymerization of various α,β-ethylenically unsaturated carboxylic acid esters using as a polymerization initiator a polymer containing a tertiary amino group obtained by the polymerization of an α,β-unsaturated carboxylic acid ester containing a tertiary amino group, in the presence of a trivalent phosphorus compound.

27 Claims, 1 Drawing Sheet

Fig. 1

PROCESS FOR PRODUCING α, β-UNSATURATED CARBOXYLIC ACID ESTER POLYMER

BACKGROUND OF THE INVENTION

1. Field of the Invention

The present invention relates to a novel and useful process for producing polymers of α,β-unsaturated carboxylic acid esters.

In particular the present invention relates to a new process for producing polymers of α,β-unsaturated carboxylic acid esters containing a tertiary amino group, which comprises polymerizing an α,β-unsaturated carboxylic acid ester containing a tertiary amino group in the presence of a specific phosphorus compound, and also relates to a novel process for producing polymers of α,β-unsaturated carboxylic acid esters suitable for the production of block copolymers, which comprises polymerizing an α,β-unsaturated carboxylic acid ester in the presence of an aforementioned polymer of an α,β-unsaturated carboxylic acid ester containing a tertiary amino group. The thus obtained polymers of α,β-unsaturated carboxylic acid esters containing a tertiary amino group and polymers of α,β-unsaturated carboxylic acid esters can be effectively used in a wide variety of applications including paints, adhesives, moldings, fibers and fiber processing.

2. Background Art

Currently, polymers of α,β-unsaturated carboxylic acid esters are typically produced by a radical polymerization method, and this method has been used for the production of various kind of such polymers. However, the production of polymers of high molecular weight by radical polymerization has required the application of bulk polymerization methods or suspension polymerization methods in which the control of heat generation is extremely problematic. Moreover, radical polymerization is unsuitable for the production of block copolymers.

Furthermore, anionic polymerization methods have also been widely investigated as a method for synthesizing polymers of α,β-unsaturated carboxylic acid esters. The synthesis of block copolymers is possible using anionic polymerization methods, but because the polymerization must be conducted at low temperatures and under anhydrous conditions, it cannot be regarded as a generally applicable synthetic method.

Moreover, recently reported methods for synthesizing block copolymers include a method using a ketene silyl acetal as an initiator [D. Y. Sogah et. al., Macromolecules, 20, p.1473–1488 (1987)], a method using a metal porphyrin complex as an initiator [Kuroki et. al., Polymer Preprint, Japan, 37(6), p.1327–1329 (1988)], and a method using a lanthanoid complex as an initiator. However, in all of these methods not only is the synthesis of the initiator extremely complicated, but there are several additional drawbacks, including a lack of stability of the initiators making the general usage thereof difficult, the requirement that the polymerization be carried out under anhydrous conditions, the inability to polymerize monomers containing active hydrogen, and remarkable discoloration of obtained polymers due to the contamination of metals originating from the initiator.

SUMMARY OF THE INVENTION

An object of the present invention is to provide a novel polymerization initiator which can be prepared easily and which is highly stable.

Another problem which the present invention aims to solve is the provision of a novel, generally applicable production method for polymers and block copolymers of α,β-unsaturated carboxylic acid esters, which yields polymers of high molecular weight and with little discoloration, in which the aforementioned polymerization initiator is used to initiate polymerization of an α,β-unsaturated carboxylic acid ester, and in which the polymerization is not inhibited by active hydrogen-containing compounds such as water or an alcohol thereby making the polymerization of monomers containing active hydrogen atoms possible.

Another object of the present invention is to provide highly practical polymers of α,β-unsaturated carboxylic acid esters and block copolymers which contains segments of α,β-unsaturated carboxylic acid ester polymers, which are produced by the production methods outlined above, and which can be applied to a variety of uses including paints, moldings, adhesives, fibers and fiber processing.

Based on intense research aimed at solving the above-described problems in the current technology, the inventors of the present invention found that polymerization of an α,β-unsaturated carboxylic acid ester containing a tertiary amino group in the presence of a specific phosphorus compound leads to the easy formation of a polymer of an α,β-unsaturated carboxylic acid ester containing a tertiary amino group which functions as a polymerization initiator for α,β-unsaturated carboxylic acid esters, and furthermore that conducting a polymerization of an α,β-unsaturated carboxylic acid ester, by use of the polymer of α,β-unsaturated carboxylic acid ester containing a tertiary amino group as a polymerization initiator, enables the production of polymers and block copolymers of α,β-unsaturated carboxylic acid esters with high molecular weight and little discoloration, via a polymerization process which was not inhibited by actiehydrogen-containing compounds such as water or alcohol, thereby making the polymerization of monomers containing active hydrogen atoms possible. These findings lead to the completion of the present invention.

The present invention then, provides the following:

a production process for polymers of α,β-unsaturated carboxylic acid esters containing a tertiary amino group, which is characterized by the polymerization of an α,β-unsaturated carboxylic acid ester (M-1) containing a tertiary amino group, in the presence of a phosphorus compound (A) represented by the general formula (I) shown below (I)

(wherein, in the formula, $R^1$ and $R^2$ are independent of one another, and each one represents an alkyl group, a substituted alkyl group, a cycloalkyl group, a substituted cycloalkyl group, an aryl group, or a substituted aryl group, and furthermore $R^1$ and $R^2$ can also be mutually linked to form a divalent organic group, and X represents a halogen atom.);

a production process for polymers of α,β-unsaturated carboxylic acid esters, which is characterized by the polymerization of an α,β-unsaturated carboxylic acid ester (M-2) using as a polymerization initiator a polymer of an α,β-unsaturated carboxylic acid ester containing a tertiary amino group obtained by the polymerization of an α,β-unsaturated carboxylic acid ester (M-1) containing a tertiary amino group, in the presence of a phosphorus compound (A) represented by the general formula (I) shown below (I)

(wherein, in the formula, $R^1$ and $R^2$ are independent of one another, and each one represents an alkyl group, a substituted alkyl group, a cycloalkyl group, a substituted cycloalkyl group, an aryl group, or a substituted aryl group, and furthermore $R^1$ and $R^2$ can also be mutually linked to form a divalent organic group, and X represents a halogen atom.);

a production process for polymers of α,β-unsaturated carboxylic acid esters, which is characterized by the polymerization of an α,β-unsaturated carboxylic acid ester (M-2) using as a polymerization initiator a polymer of an α,β-unsaturated carboxylic acid ester containing a tertiary amino group (M-1), the polymer having a group represented by the general formula (II) shown below (II)

(wherein, in the formula, $R^1$ and $R^2$ are independent of one another, and each one represents an alkyl group, a substituted alkyl group, a cycloalkyl group, a substituted cycloalkyl group, an aryl group, or a substituted aryl group, and furthermore $R^1$ and $R^2$ can also be mutually linked to form a divalent organic group.);

a production process for polymers of α,β-unsaturated carboxylic acid esters, which is characterized by the polymerization of an α,β-unsaturated carboxylic acid ester (M-2) using as a polymerization initiator a compound represented by the general formula (III) shown below (III)

(wherein, in the formula, $R^1$ and $R^2$ are independent of one another, and each one represents an alkyl group, a substituted alkyl group, a cycloalkyl group, a substituted cycloalkyl group, an aryl group, or a substituted aryl group, and furthermore $R^1$ and $R^2$ can also be mutually linked to form a divalent organic group, $R^3$ represents an N,N-dialkylaminoalkyl group, $R^4$ represents a hydrogen atom or a methyl group, and n represents 0 or an integer of 1 or greater.); and a production process for block polymers in which, as the α,β-unsaturated carboxylic acid ester (M-2), two or more different ingredients are used, which are selected from the group consisting of α,β-unsaturated carboxylic acid esters and α,β-unsaturated carboxylic acid ester mixtures, which are then sequentially polymerized;

The present invention provides a novel polymer of an α,β-unsaturated carboxylic acid ester containing a tertiary amino group which functions as a polymerization initiator for α,β-unsaturated carboxylic acid esters and which is produced by polymerization of an α,β-unsaturated carboxylic acid ester containing a tertiary amino group in the presence of a specific phosphorus compound. Furthermore the invention provides a novel, generally applicable production method for polymers and block copolymers of α,β-unsaturated carboxylic acid esters with high molecular weight and little discoloration, in which the polymerization is not inhibited by active hydrogen-containing compounds such as water or alcohol, thereby making the polymerization of monomers containing active hydrogen atoms possible, and in which a polymer of an α,β-unsaturated carboxylic acid ester containing a tertiary amino group is used as a polymerization initiator in the polymerization of an α,β-unsaturated carboxylic acid ester.

The various polymers and block copolymers of α,β-unsaturated carboxylic acid esters formed by the production processes of the present invention can be effectively used in a wide variety of applications including paints, adhesives, moldings, fibers and fiber processing.

DESCRIPTION OF THE PREFERRED EMBODIMENTS

Following is a detailed explanation of the production process of the present invention for producing a polymer of an α,β-unsaturated carboxylic acid ester containing a tertiary amino group, and the production process for an α,β-unsaturated carboxylic acid ester which utilizes the aforementioned polymer of an α,β-unsaturated carboxylic acid ester containing a tertiary amino group as the polymerization initiator.

First, the aforementioned phosphorus compound (A) which is used in the production of polymers of α,β-unsaturated carboxylic acid esters containing a tertiary amino group of the present invention is a trivalent phosphorus compound which is represented by the general formula (I) shown below.

(I)

(wherein, in the formula, $R^1$ and $R^2$ are independent of one another, and each one represents an alkyl group, a substituted alkyl group, a cycloalkyl group, a substituted cycloalkyl group, an aryl group, or a substituted aryl group, and furthermore $R^1$ and $R^2$ can also be mutually linked to form a divalent organic group, and X represents a halogen atom.).

Particularly representative examples of the trivalent phosphorus compound (A) include the various dialkylmonohalophosphines such as chlorodiethylphosphine, chlorodi-n-propylphosphine, chlorodi-n-butylphosphine, chloromethyl-n-propylphosphine, bromodimethylphosphine, bromodiethylphosphine, bromodi-n-propylphosphine, chloro-n-butyl-n-propylphosphine, iododimethylphosphine, iododiethylphosphine, iododi-n-propylphosphine, iododi-n-butylphosphine and iodo-methyl-n-propylphosphine; the various monohalodicycloalkylphosphines such as chlorodicyclohexylphosphine and chlorodicyclopentylphosphine; the various monohaloalkylarylphosphines such as chloromethylphenylphosphine, chloromethyl-p-tolylphosphine, chloroethylphenylphosphine, bromomethylphenylphosphine, bromomethyl-p-tolylphosphine, bromoethylphenylphosphine, iodomethylphenylphosphine, iodomethyl-p-tolylphosphine and iodoethylphenylphosphine;

and the various monohalodiarylphosphines such as chlorodiphenylphosphine, chlorodi-p-tolylphosphine, chlorophenyl-p-tolylphosphine, bromodiphenylphosphine, bromodi-p-tolylphosphine, iododiphenylphosphine, iododi-p-tolylphosphine and iodophenyl-p-tolylphosphine.

Furthermore, in the general formula (I) above, $R^1$ and $R^2$ can also be mutually linked together to form a phosphorus compound containing a cyclic structure formed by a divalent organic group such as an alkylene chain, an alkylene chain which is interrupted by a hetero atom, an alkylene chain which is interrupted by an olefin based double bond, or an alkylene chain which is interrupted by an arylene unit.

Of the trivalent phosphorus compounds detailed above, the use of monochlorodiarylphosphines such as chlorodiphenylphosphine and chloro-di-p-tolylphosphine is particularly preferable in terms of availability and ease of handling.

Representative examples of the α,β-unsaturated carboxylic acid ester containing a tertiary amino group (M-1), used in the production of a polymer of an α,β-unsaturated carboxylic acid ester containing a tertiary amino group include esters, which contains a tertiary amino group and which does not contain a functional group having an active hydrogen, the ester being derived from α,β-unsaturated monocarboxylic acids and α,β-unsaturated dicarboxylic acids such as (meth)acrylic acid, crotonic acid, maleic acid, fumaric acid and itaconic acid.

Specific examples of representative α,β-unsaturated carboxylic acid esters containing a tertiary amino group (M-1) include the various (meth)acrylic acid esters containing a tertiary amino group such as 2-dimethylaminoethyl (meth)acrylate, 2-diethylaminoethyl (meth)acrylate, 2-di-n-propylaminoethyl (meth)acrylate, 3-dimethylaminopropyl (meth)acrylate, 4-dimethylaminobutyl (meth)acrylate and N-[2-(meth)acryloyloxy] ethylmorpholine; the various crotonic acid esters containing a tertiary amino group such as 2-dimethylaminoethyl crotonate, 2-di-n-propylaminoethyl crotonate, 3-dimethylaminopropyl crotonate and 4-dimethylaminobutyl crotonate; maleic acid esters such as maleic acid mono-2-dimethylaminoethyl monomethyl ester and maleic acid mono-3-dimethylaminopropyl monomethyl ester;

itaconic acid esters such as itaconic acid mono-2-dimethylaminoethyl monomethyl ester and itaconic acid mono-3-dimethylaminopropyl monomethyl ester; and fumaric acid esters such as fumaric acid mono-2-dimethylaminoethyl monomethyl ester and fumaric acid mono-3-dimethylaminopropyl monomethyl ester; and these esters can be used singly, or in combinations of two or more.

Of the α,β-unsaturated carboxylic acid esters containing a tertiary amino group described above, (meth)acrylic acid esters containing a tertiary amino group are particularly preferable in terms of polymerizability.

The α,β-unsaturated carboxylic acid esters (M-1) described above can be used without the removal of water or polymerization inhibitors contained therein, but in order to obtain a good polymerization yield it is preferable to remove water and polymerization inhibitors according to known methods.

The polymerization of an α,β-unsaturated carboxylic acid ester (M-1) in the presence of a phosphorus compound (A) can be conducted by various methods including 1) reaction by dropping (M-1) into the phosphorus compound (A), 2) reaction by dropping the ester (M-1) into a mixture of the phosphorus compound (A) and a solvent, 3) reaction by dropping the phosphorus compound (A) into (M-1), 4) reaction by dropping the phosphorus compound (A) into a mixture of (M-1) and a solvent, and 5) reaction by dropping both the phosphorus compound (A) and (M-1) simultaneously into a solvent.

The molar ratio of the compound (M-1) to (A) used for the reaction should be set within the range of 1 to 1,000,000 mol of (M-1) per 1 mol of compound (A), preferably within the range of 1.2 to 100,000 mol, and more preferably within the range of 1.5 to 50,000 mol.

If the amount of (M-1) used per 1 mol of compound (A) is less than 1 mol, then large amounts of unreacted compound (A) will remain, whereas at amounts greater than 1,000,000 mols the speed of polymerization will decrease, both of which are undesirable.

In those cases where the amount of (M-1) used per 1 mol of compound (A) is small, that is, for example close to 1 mol, polymers of comparatively low molecular weight are formed, while in contrast, if the amount of (M-1) used is large, for example larger than 100 mols, polymers of comparatively high molecular weight are formed.

In the case of the methods 2), 4) and 5) described above where polymerization is carried out in a solvent, basically any of the widely known compounds having no active hydrogen can be used as a solvent. Particularly representative examples of suitable solvents include the various hydrocarbon solvents such as benzene, toluene, xylene, cyclohexane, methylcyclohexane, n-hexane and n-octane; the various ester solvents such as methyl formate, ethyl formate, methyl acetate, ethyl acetate, n-butyl acetate, isobutyl acetate, methyl propionate and ethylene glycol monoethylether acetate; the various ketone solvents such as acetone, methyl ethyl ketone, methyl isobutyl ketone and cyclohexanone; the various ether solvents such as diethyl ether, di-isopropyl ether, di-n-butyl ether, ethylene glycol dimethyl ether, ethylene glycol diethyl ether, ethylene glycol di-n-propyl ether, ethylene glycol di-n-butyl ether, diethylene glycol dimethyl ether, diethylene glycol diethyl ether and triethylene glycol dimethyl ether; halogenated hydrocarbons such as chloroform, carbon tetrachloride and 1,2-dichloroethane; and the various aprotic polar solvents such as dimethyl formamide, N,N-dimethylacetamide, N,N-dimethylpropionamide, N-methyl-2-pyrrolidone, dimethyl sulfoxide and N,N'-dimethyl ethylene urea.

These solvents can be used singly, or in combinations of two or more solvents.

Of the solvents listed above, in terms of ensuring a high polymerization rate, ether solvents, linear or cyclic amide solvents, and ester solvents are particularly preferable.

Provided the water content is below a reasonable level, the solvents above can be used as is, with no special dehydration processing, although in order to achieve a higher polymerization conversion and ensure the formation of polymers with a narrower molecular weight distribution, it is preferable to dehydrate the solvent and reduce the water content prior to reaction, by a method appropriate to the respective solvent.

The polymerization temperature in preparing a polymer of an α,β-unsaturated carboxylic acid ester containing a tertiary amino group by one of the methods outlined above, is within the range of −20 to 130° C., preferably within the range of 0 to 100° C. being preferable, and more preferably within the range of 20 to 90° C.

If the reaction temperature is lower than −20° C. then the speed of polymerization will decrease markedly, whereas at temperatures above 130° C. marked decrease in the polymer yield occurs, presumably because side reactions are more likely to lead to deactivation of the polymerization active sites at the growth terminals.

Furthermore, the polymerization reaction time in preparing a polymer of an α,β-unsaturated carboxylic acid ester containing a tertiary amino group by one of the methods outlined above, will vary depending on factors such as the ratio used of compound (A) to (M-1) and the polymerization temperature. Reaction time of 3 to 72 hours is appropriate.

It is also preferable to carry out all the steps in the polymerization reaction under an atmosphere of an inert gas such as argon or nitrogen.

The polymer of α,β-unsaturated carboxylic acid ester containing a tertiary amino group [hereafter referred to as the polymer (P-1)] prepared by the methods outlined above, both in the state immediately after the polymerization reaction, and even after an isolation procedure such as reprecipitation, retains polymerization activity. Therefore, subsequent addition of an α,β-unsaturated carboxylic acid ester or a mixture of α,β-unsaturated carboxylic acid esters to the polymer (P-1) leads to polymerization of the monomer or monomer mixture, forming polymers or block copolymers of the α,β-unsaturated carboxylic acid ester.

That is, the polymer (P-1) prepared by the methods above functions as a polymerization initiator for the polymerization of an α,β-unsaturated carboxylic acid ester.

The polymer (P-1) is a polymer of an α,β-unsaturated carboxylic acid ester containing a tertiary amino group, and contains a group represented by the general formula (II) shown below.

(II)

wherein, in the formula, $R^1$ and $R^2$ are independent of one another, and each one represents an alkyl group, a substituted alkyl group, a cycloalkyl group, a substituted cycloalkyl group, an aryl group, or a substituted aryl group, and furthermore $R^1$ and $R^2$ can also be mutually linked to form a divalent organic group.)

An example of the polymer (P-1) is the polymer represented by the general formula (IV) shown below.

(IV)

(wherein, in the formula, $R^1$ and $R^2$ are independent of one another, and each one represents an alkyl group, a substituted alkyl group, a cycloalkyl group, a substituted cycloalkyl group, an aryl group, or a substituted aryl group, and furthermore $R^1$ and $R^2$ can also be mutually linked to form a divalent organic group, $R^3$ represents an N,N-dialkylaminoalkyl group, $R^4$ represents a hydrogen atom or a methyl group, and m represents an integer of 1 or greater.)

Of the polymers represented by the general formula (IV), polymers in which $R^1$ and $R^2$ are independently aryl groups, $R^3$ is a 2-dimethylaminoethyl group, $R^4$ is a methyl group, and X is a chlorine atom are preferable.

It is presumed that the polymers represented by the general formula (IV) are produced by the reaction of a phosphorus compound and an α,β-unsaturated carboxylic acid ester containing a tertiary amino group according to the following reaction scheme.

(wherein, in the formula, $R^1$ and $R^2$ are independent of one another, and each one represents an alkyl group, a substituted alkyl group, a cycloalkyl group, a substituted cycloalkyl group, an aryl group, or a substituted aryl group, and furthermore $R^1$ and $R^2$ can also be mutually linked to form a divalent organic group, X represents a halogen atom, $R^3$ represents a dialkylaminoalkyl group, $R^4$ represents a hydrogen atom or a methyl group, and m represents an integer of 1 or greater.)

The compound represented by the general formula (V) is not a polymer, but it functions as a polymerization initiator for the polymerization of an α,β-unsaturated carboxylic acid ester in the same way as the polymer represented by the general formula (IV), and in the discussion below, for the sake of convenience, both the compound represented by the general formula (V) and the polymer represented by the general formula (IV) will be referred to as the polymer (P-1).

The α,β-unsaturated carboxylic acid ester (M-2) to be polymerized using the polymer (P-1) as a polymerization initiator, can be either a monomer containing an active hydrogen or a monomer which does not contain any active hydrogen.

Representative examples of the α,β-unsaturated carboxylic acid ester (M-2) include the various esters derived from the various α,β-unsaturated monocarboxylic acids and α,β-unsaturated dicarboxylic acids such as (meth)acrylic acid, crotonic acid, maleic acid, fumaric acid and itaconic acid.

Of these various α,β-unsaturated carboxylic acid esters, particularly suitable examples include the esters of α,β-unsaturated monocarboxylic acids such as (meth)acrylic acid and crotonic acid, more specifically the respective esters formed from the $C_1$ to $C_{18}$ alkyl alcohols, such as the methyl ester, ethyl ester, n-propyl ester, iso-propyl ester, n-butyl ester, iso-butyl ester, tert-butyl ester, n-pentyl ester, 2-ethylhexyl ester, n-octyl ester, n-decyl ester, n-dodecyl ester and the stearyl ester;

esters formed from the various alicyclic alcohols, such as the cyclopentyl ester, cyclohexyl ester, 4-methylcyclohexyl ester and the isobornyl ester;

aryl esters which are represented by esters formed from the various phenols, such as the phenyl ester, 4-methylphenyl ester and the 4-chlorophenyl ester; esters formed from the various aralkyl alcohols, such as the benzyl ester, 1-phenylethyl ester and the 2-phenylethyl ester;

esters formed from the various alcohols containing a blocked hydroxy group, such as the 2,2-dimethyl-1,3-dioxolan-4-ylmethyl ester, 2-(1-methoxyethoxy)ethyl ester, 2-(1-ethoxyethoxy)ethyl ester, 2-trimethylsilyloxyethyl ester, 4-trimethylsilyloxybutyl ester and the 2-(dimethyl-tert-butylsilyloxy)ethyl ester; monomers which contains a hydroxyl group and which are esters formed from the various polyhydric alcohols, such as the 2-hydroxyethyl ester, 2-hydroxypropyl ester, 4-hydroxybutyl ester and the 2,3-dihydroxypropyl ester;

2-carboxyethyl ester, and other monomers containing a carboxyl group obtained by reaction of the above-listed hydroxy group-containing monomers with a carboxylic acid anhydride such as succinic anhydride, phthalic anhydride, hexahydro phthalic anhydride and trimellitic anhydride;

monomers containing a block carboxyl group such as the trimethylsilyl ester, dimethyl-tert-butylsilyl ester, 1-ethoxyethyl ester, 1-n-butoxyethyl ester, tetrahydrofuran-2-yl ester and the tetrahydropyran-2-yl ester; esters formed from alcohols containing an acetoacetoxy group, such as the 2-acetoacetoxyethyl ester and the 4-acetoacetoxybutyl ester; esters formed from alcohols containing an epoxy group, such as the glycidyl ester and the 2-methylglycidyl ester; esters formed from alcohols containing a cyclic carbonate group, such as the 2,3-carbonatopropyl ester, 2-methyl-2,3-carbonatopropyl ester and the 3,4-carbonatobutyl ester; esters formed from various alcohols containing an ether linkage, such as the 2-methoxyethyl ester, 2-ethoxyethyl ester and the 2-(2-methoxyethoxy) ethyl ester;

and the esters formed from polyethers containing a hydroxy group at one end, such as polyethylene glycol, polypropylene glycol and polytetramethylene glycol in which the other end is blocked with an alkoxy group.

Of the various $\alpha,\beta$-unsaturated carboxylic acid esters, more specific examples of the $\alpha,\beta$-unsaturated dicarboxylic acid esters are esters formed from the various $\alpha,\beta$-unsaturated dicarboxylic acids mentioned above, including the monoesters and diesters formed from the various $C_1$ to $C_{18}$ alcohols; the monoesters and diesters formed from the various alicyclic alcohols; the monoesters and diesters formed from the various phenols;

the diesters formed from alcohols containing a blocked hydroxy group, such as bis(2,2-dimethyl-1,3-dioxolan-4-ylmethyl ester), bis[2-(1-methoxyethoxy)ethyl ester], bis[2-(1-ethoxyethoxy)ethyl ester], bis(2-trimethylsilyloxyethyl ester), bis(4-trimethylsilyloxybutyl ester) and bis(2-(dimethyl-tert-butylsilyloxy)ethyl ester);

monomers containing a blocked carboxyl group such as bis(trimethylsilyl ester), bis(dimethyl-tert-butylsilyl ester) and bis(1-ethoxyethyl ester);

monoesters and diesters formed from the various aralkyl alcohols; monoesters and diesters formed from the various alcohols containing an epoxy group; monoesters and diesters formed from the various alcohols containing a cyclic carbonate group; monoesters and diesters formed from the various alcohols containing an ether linkage; and monoesters and diesters formed from the various polyethers containing a hydroxy group at one end, and furthermore mixed esters of the various alcohols such as those mentioned above can also be used.

Moreover, the various $\alpha,\beta$-unsaturated carboxylic acid esters containing a tertiary amino group exemplified above as representative examples of (M-1) can also be used as the ester (M-2).

In carrying out the block copolymer production process of the present invention, of the various $\alpha,\beta$-unsaturated carboxylic acid esters presented above, the use of (meth)acrylic acid esters is particularly desirable.

In anionic polymerization and other living polymerization reactions, generally the presence of water halts the polymerization reaction. However, in polymerization reactions in which the polymer (P-1) is used as an initiator, surprisingly the polymerization reaction does not halt even in the presence of water or active hydrogen containing compounds, enabling polymerization to be carried out even if water or alcohols are present, as well as enabling polymerization to be conducted with monomers which contain a group containing active hydrogen such as a hydroxy group.

Consequently with the $\alpha,\beta$-unsaturated carboxylic acid esters used for (M-2), the esters can be used without the removal of any water or polymerization inhibitors contained therein.

In the production process of the present invention in which an $\alpha,\beta$-unsaturated carboxylic acid ester is polymerized with the polymer (P-1) as a polymerization initiator, carrying out the polymerization of (M-2), by use of (P-1) in a catalytic amount less than 3% by weight with respect to (M-2), enables preparation of polymers of (M-2).

With the use of (P-1) in a catalytic amount, if, as the monomer (M-2), two or more different ingredients are used, which are selected from the group consisting of monomers and monomer mixtures, which are then sequentially polymerized, then the preparation of diblock copolymers and triblock copolymers which contain two or more segments derived from the monomers (M-2) is possible.

Furthermore, the use of the polymer (P-1) in amounts exceeding 3% by weight with respect to the monomer (M-2) enables the preparation of block copolymers which contain segments of the polymer (P-1) and segments derived from the monomer (M-2). In such a case, as the monomer (M-2), if two or more different ingredients are used, which are selected from the group consisting of $\alpha,\beta$-unsaturated carboxylic acid esters and $\alpha,\beta$-unsaturated carboxylic acid ester mixtures, which are then sequentially polymerized, then the preparation of triblock copolymers and tetrablock copolymers which contain a segment of the polymer (P-1) and two or more segments derived from the monomers (M-2) is possible.

Following is a detailed explanation of the representative cases in which a polymer or block copolymer of an $\alpha,\beta$-unsaturated carboxylic acid ester is produced, either by a polymerization in which the monomer (M-2) is a single monomer or a single monomer mixture [hereafter referred to as the second monomer (M-2-1)], or by a polymerization in which the monomer (M-2-1) and a different single monomer or single monomer mixture [hereafter referred to as the third monomer (M-2-2)] are sequentially polymerized.

The $\alpha,\beta$-unsaturated carboxylic acid esters (M-1) and (M-2-1) used in the production of the polymer (P-1) can be identical or different. In the case where (M-1) and (M-2-1) are identical, the polymer obtained by the polymerization of (M-2-1) in the presence of (P-1) is the homopolymer of (M-1), whereas in the case where (M-1) and (M-2-1) are different, a polymer is obtained containing both a (P-1) segment and a segment derived from (M-2-1).

Various methods can be applied to prepare a polymer of the second monomer (M-2-1) or a diblock copolymer containing both a (M-2-1) polymer segment and a polymer (P-1) segment, from the polymer (P-1) and the second monomer (M-2-1), including 6) polymerization of a mixture of the polymer (P-1) and the second monomer (M-2-1), 7) polymerization by dropping the second monomer (M-2-1) into a solution of the polymer (P-1), and 8) polymerization by dropping a solution of the polymer (P-1) into the second monomer (M-2-1).

In order to prepare a diblock copolymer or triblock copolymer from the polymer (P-1), the second monomer (M-2-1) and the third monomer (M-2-2), first a polymer of (M-2-1) or diblock copolymer of is prepared by a method such as that outlined in 6) to 8), and then the polymer or diblock copolymer thus obtained is reacted further with the third monomer (M-2-2) by a method similar to that described in 6) to 8).

In the various methods outlined above, in those instances where a medium such as a solvent is used, in addition to the various organic solvents listed above as being suitable for the preparation of the polymer (P-1), the various solvents containing a hydroxy group such as methanol, ethanol, n-propanol, isopropanol, n-butanol, isobutanol, ethylene glycol monomethyl ether, ethylene glycol monoethyl ether, ethylene glycol mono-n-butyl ether and propylene glycol mono-n-propyl ether, or even water can be used as the polymerization medium.

In the polymerization methods outlined in 6) to 8), the polymerization can be conducted with the monomers uniformly dissolved in the medium (solution polymerization), or with the monomers dispersed or emulsified in the medium (suspension polymerization and emulsion polymerization respectively).

In the case where the polymerization is conducted with monomers dispersed or emulsified in a medium, dispersion stabilizing agents or emulsifiers can be used to stabilize the polymerization system, if necessary.

In the preparation of a polymer of (M-2-1) or a diblock copolymer from the polymer (P-1) and the second monomer (M-2-1), the ratio of (P-1) to (M-2-1) can be set as desired, but typically (P-1):(M-2-1) weight ratios within the range of 0.05:99.95 to 97:3 are used, weight ratios within the range of 0.2:99.8 to 95:5 being preferable, and weight ratios within the range of 0.5:99.5 to 95:5 being even more preferable.

In the preparation of a diblock copolymer or a triblock copolymer from the polymer (P-1), the second monomer (M-2-1) and the third monomer (M-2-2), the ratio of (P-1) to (M-2-1) to (M-2-2) can be set as desired, but expressed relative to 100 parts by weight of a combined weight of (P-1), (M-2-1) and (M-2-2), the amount of (P-1) is typically within the range of 0.05 to 97 parts by weight, amounts within the range of 0.2 to 95 parts by weight being preferable, and amounts within the range of 0.5 to 95 parts by weight being even more preferable.

In those cases where the preparation of the various polymers or block copolymers by the methods outlined above is carried out using a medium such as a solvent or water, then the amount of medium used is within the range of 20 to 1,500 parts by weight, either per 100 parts by weight of the α,β-unsaturated carboxylic acid ester (M-2-1) which is to be polymerized with the polymer (P-1), or per 100 parts by weight of the combined α,β-unsaturated carboxylic acid esters (M-2-1) and (M-2-2) which are to be polymerized with the polymer (P-1).

The processes outlined above can be used to prepare polymers or block copolymers, but the reaction temperature during each polymerization process is typically within the range of −20 to +130° C., within the range of 0 to 100° C. being preferable, and values within the range of 20 to 90° C. being even more preferable.

Furthermore, it is preferable to carry out all the steps in the polymerization reactions described above under an atmosphere of an inert gas such as argon or nitrogen.

The reaction time for each polymerization process in the preparation of the polymers or block copolymers varies depending on factors such as the type of polymer (P-1) and the types of α,β-unsaturated carboxylic acid esters (M-2-1) and (M-2-2) used, whether a solvent is used or not, and if so the type of solvent, and the reaction temperature. Typical reaction time is such that ensures a polymerization conversion of 80% or greater in each polymerization process, and reaction time which ensures a polymerization conversion of 90% or greater is preferable.

Furthermore, in the case where, as the α,β-unsaturated carboxylic acid ester (M-2), three or more different ingredients are used, which are selected from the group consisting of α,β-unsaturated carboxylic acid esters and α,β-unsaturated carboxylic acid ester mixtures, which are then sequentially polymerized, the reaction can be carried out according to the same methods as those above.

Consequently, in the preparation of polymers or diblock copolymers of the various α,β-unsaturated carboxylic acid esters from a polymer (P-1) and a monomer (M-2), the ratio of (P-1) to (M-2) can be set as desired, but typically (P-1):(M-2) ratios within the range of 0.05:99.95 to 97:3 are used, ratios within the range of 0.2:99.8 to 95:5 being preferable, and ratios within the range of 0.5:99.5 to 95:5 being even more desirable.

In this way, it is possible to prepare the various polymers, the diblock copolymers, triblock copolymers or tetrablock copolymers which contains a polymer segment of an α,β-unsaturated carboxylic acid ester having a tertiary amino group, as well as the diblock copolymers, triblock copolymers or tetrablock copolymers in which the content of polymer segments of an α,β-unsaturated carboxylic acid ester containing a tertiary amino group is extremely small.

The polymers of the present invention, namely the polymers (P-1) containing a tertiary amino group, and the polymers and various block copolymers of α,β-unsaturated carboxylic acid esters prepared using the polymer (P-1) as a polymerization initiator, can be effectively used in a wide variety of applications including paints, adhesives, moldings, fibers and fiber processing. Furthermore common, well-known materials can be used as the articles or substrates to which these products of the present invention are applied in each of the respective applications.

EXAMPLES

The present invention is explained more specifically below, with reference to examples and application examples, but the present invention is in no way limited to these examples.

Example 1

This example shows the preparation of a polymer of an α,β-unsaturated carboxylic acid ester containing a tertiary amino group.

Figure 1:
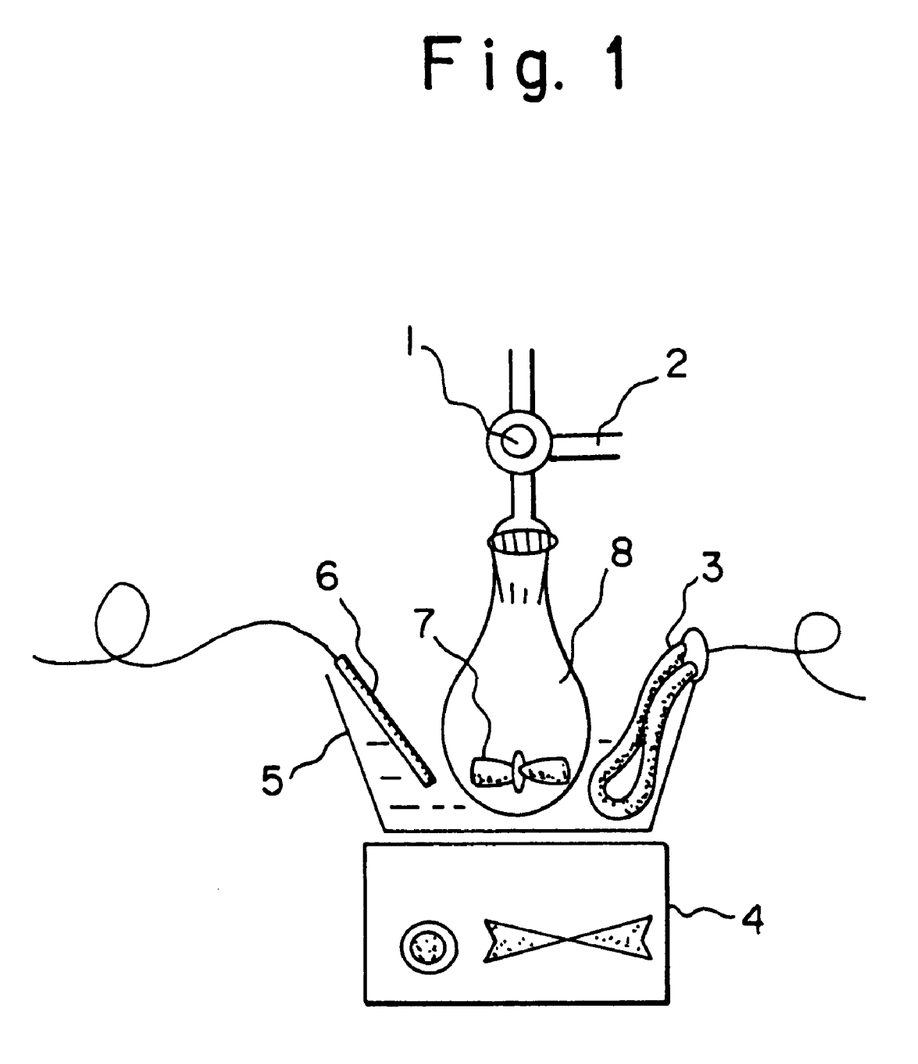
FIG. 1 is a reaction apparatus used in the examples of the present invention.

FIG. 1 shows the reaction apparatus used for the examples of the present invention. In the diagram, numeral 1 refers to a three way cock, numeral 2 to an argon or nitrogen inlet tube, numeral 3 to a heater, numeral 4 to a magnetic stirrer, numeral 5 to an oil bath, numeral 6 to a thermosensor, numeral 7 to a stir bar and numeral 8 to a reaction vessel.

After evacuating the inside of the reaction vessel 8 of the reaction apparatus shown in FIG. 1 using a vacuum pump, argon gas was introduced through the argon inlet tube 2. This operation was repeated a further two times, thus replacing the air inside the reaction vessel 8 with argon.

Next, while argon was passed through the three way cock 1, 10 ml of dry dimethyl formamide (DMF), 2.28 g (14.5 mmol) of 2-dimethylaminoethyl methacrylate (DAEMA), and 0.1 ml of a toluene solution of chlorodiphenylphosphine (CDP) (0.09 mmol of CDP) (the toluene solution was prepared by dissolving 0.2 g of CDP in toluene to make 1 ml of solution—hereafter this solution is abbreviated as "CDP-toluene solution") were added sequentially to the reaction vessel using a syringe.

The temperature of the mixture was then raised to 70° C. under stirring, and the polymerization reaction was continued while stirring the mixture at this temperature for 48 hours. After completion of the reaction, the reaction mixture was poured into 260 ml of diethyl ether (DEE) to precipitate the polymer formed. The polymer was then separated by filtration and air dried overnight followed by vacuum drying for 12 hours at room temperature, to yield 1.96 g (yield=86%) of a slightly yellow poly-DAEMA.

Example 2

This example also shows the preparation of a polymer of an α,β-unsaturated carboxylic acid ester containing a tertiary amino group.

Using a reaction vessel 8 the same as that used in example 1, and using the same method as example 1, the air inside the reaction vessel 8 was replaced with argon. Next, while argon was passed through the three way cock 1, 0.47 g (3.0 mmol) of DAEMA was added to the reaction vessel 8 using a syringe, and the reaction vessel 8 was then cooled in an ice bath.

Next, with stirring, 0.22 g (1 mmol) of CDP was added using a syringe. Stirring was then continued for 10 minutes under ice-cooling, and then the temperature was raised to room temperature and stirring was continued for a further 3 hours. 3.0 ml of dry DMF was then added and stirring was continued at room temperature for 12 hours, to yield a slightly yellow DMF solution of a DAEMA polymer with concentration of 19.6%. This polymer solution is abbreviated hereinafter as (P-1-1).

Analysis of (P-1-1) by $^1$H-NMR revealed that the triplet peak of DAEMA at approximately 4.5 ppm had disappeared, and a singlet peak resulting from the DAEMA polymer had appeared at approximately 4.2 ppm. Furthermore, analysis of the DMF solution of the reaction mixture by $^{31}$P-NMR (the absorption peak of the phosphorus atom of phosphoric acid was used as a reference peak) revealed that the singlet absorption peak of the starting material CDP at 88 ppm had disappeared, and a new singlet peak at approximately 21 ppm and a plurality of peaks within the range of 28 of 36 ppm had appeared. These analysis results shows that the CDP has reacted with the DAEMA and taken part in a polymerization reaction, and it can be concluded that a DAEMA polymer containing residues of the CDP has been formed.

Example 3

This example shows the preparation of a diblock copolymer which has a polymer segment of an α,β-unsaturated carboxylic acid ester containing a tertiary amino group and another polymer segment.

Using a reaction vessel 8 the same as that used in example 1, and using the same method as example 1, the air inside the reaction vessel 8 was replaced with argon. Next, while argon was passed through the three way cock 1, 10 ml of dry DMF, 2.28 g (14.5 mmol) of DAEMA as the monomer (M-1), and 0.1 ml of CDP-toluene solution (0.09 mmol of CDP) were sequentially added to the reaction vessel using a syringe. The temperature of the mixture was raised to 60° C. under stirring, and the reaction mixture was then heated at this temperature for 24 hours, to yield a poly-DAEMA having a polymerization active group at the terminal. Analysis of the reaction mixture by $^1$H-NMR revealed that the polymerization conversion of the DAEMA exceeded 90%.

Next, to the solution containing the poly-DAEMA, 5 ml of dry DMF and 2.56 g (14.5 mmol) of benzyl methacrylate (BZMA) as the second monomer (M-2-1) were added using a syringe, and the resulting mixture was stirred for 24 hours at 60° C. to allow the reaction to proceed.

The reaction mixture thus obtained was poured into 400 ml of DEE to precipitate the polymer. The polymer was then separated by filtration and air dried overnight followed by vacuum drying for 12 hours at room temperature, to yield 3.48 g (yield=83%) of a slightly yellow poly-DAEMA.BZMA.diblock copolymer.

Composition analysis of the diblock copolymer by $^1$H-NMR revealed that a molar ratio of DAEMA units/BZMA units was 54/46.

Example 4

This example also shows the preparation of a diblock copolymer containing a polymer segment of an α,β-unsaturated carboxylic acid ester containing a tertiary amino group and another polymer segment.

The polymerization reaction was carried out in the same manner as example 3, with the exception that 2.24 g (14.5 mmol) of cyclohexyl acrylate (CHA) was used as the second monomer (M-2-1) instead of benzyl methacrylate (BZMA).

The reaction mixture thus obtained was poured into 400 ml of DEE to precipitate the polymer. The polymer was then separated by filtration and air dried overnight followed by drying under vacuum for 12 hours at room temperature, to yield 2.82 g (yield=59%) of a slightly yellow poly-DAEMA.CHA.diblock copolymer.

The number average molecular weight (Mn) of the diblock copolymer prepared was 69,600 (measured by GPC with DMF as the elution solvent), and moreover composition analysis of the diblock copolymer by $^1$H-NMR revealed that a molar ratio of DAEMA units/CHA units was 71/29.

Example 5

This example shows the preparation of a polymer of an α,β-unsaturated carboxylic acid ester.

Using a reaction vessel 8 the same as that used in example 1, and using the same method as example 1, the air inside the reaction vessel 8 was replaced with argon. Next, while argon was passed through the three way cock 1, 3 ml of DMF, 0.72 g (5.1 mmol) of n-butyl methacrylate (BMA) as the monomer (M-2-1), and 0.11 g (0.032 mmol of phosphorus atoms) of the polymer solution (P-1-1) prepared in example 2 were added sequentially to the reaction vessel using a syringe.

The temperature of the mixture was raised to 60° C. while stirring, and the reaction mixture was then maintained at this temperature, with stirring, for 24 hours. To the reaction mixture thus obtained was added 3 ml of chloroform to give a uniform solution. The solution obtained was poured into 80 ml of DEE to precipitate the polymer. The polymer was then separated by filtration and air dried overnight followed by drying under vacuum for 12 hours at room temperature, to yield 0.45 g (yield=61%) of a colorless poly-BMA polymer.

The Mn of the polymer thus obtained was 133,000 (measured by GPC with tetrahydrofuran as the elution solvent).

Example 6

This example also shows the preparation of a polymer of an α,β-unsaturated carboxylic acid ester.

The polymerization reaction and subsequent workup was carried out in the same manner as example 5, with the exceptions that 0.86 g (5.1 mmol) of cyclohexyl methacrylate (CHMA) was used instead of BMA, and 0.1 ml of water was added to the reaction system. The reaction yielded 0.79 g (yield=90%) of a colorless poly-CHMA polymer.

The Mn of the polymer thus obtained was 295,000 (measured by GPC with tetrahydrofuran as the elution solvent).

Example 7

This example also shows the preparation of a polymer of an α,β-unsaturated carboxylic acid ester.

The polymerization reaction and subsequent workup was carried out in the same manner as example 5, with the exception that 0.79 g (5.1 mmol) of CHA was used instead of BMA, to yield 0.57 g (yield=70%) of a colorless poly-CHA polymer.

The Mn of the polymer thus obtained was 89,000 (measured by GPC with tetrahydrofuran as the elution solvent).

Example 8

This example also shows the preparation of a polymer of an α,β-unsaturated carboxylic acid ester.

Using a reaction vessel 8 the same as that used in example 1, and using the same method as example 1, the air inside the reaction vessel 8 was replaced with argon. Next, while argon was passed through the three way cock 1, 0.86 g (5.1 mmol) of CHMA as the monomer (M-2-1), and 0.11 g (0.032 mmol of phosphorus atoms) of the polymer solution (P-1-1) prepared in example 2 were added to the reaction vessel using a syringe.

The temperature of the mixture was raised to 60° C. while stirring, and the reaction mixture was then maintained at this temperature, with stirring, for 24 hours. The reaction mixture began to solidify during the reaction and the reaction product obtained was a solid. To this reaction product was added 6 ml of chloroform to give a uniform solution. The solution obtained was poured into 80 ml of DEE to precipitate the polymer. The polymer was then separated by filtration and air dried overnight followed by drying under vacuum for 12 hours at room temperature, to yield 0.85 g (yield=96%) of a colorless poly-CHMA polymer.

Example 9

This example also shows the preparation of a polymer of an α,β-unsaturated carboxylic acid ester.

The polymerization reaction and subsequent workup was carried out in the same manner as example 5 with the exception that 0.77 g (5.9 mmol) of 2-hydroxyethyl methacrylate (HEMA) was used instead of BMA, to yield 0.65 g (yield=82%) of a poly-HEMA polymer.

The Mn of the polymer thus obtained was 120,000 (measured by GPC with DMF as the elution solvent).

Example 10

This example also shows the preparation of a polymer of an α,β-unsaturated carboxylic acid ester.

The polymerization reaction and subsequent workup was carried out in the same manner as example 9, with the exception that 3 ml of methanol was used instead of DMF, to yield 0.45 g (yield=57%) of a colorless poly-HEMA polymer.

Example 11

This example also shows the preparation of a polymer of an α,β-unsaturated carboxylic acid ester.

The polymerization reaction and subsequent workup was carried out in the same manner as example 9, with the exception that a mixture of 0.38 g (2.9 mmol) of HEMA and 0.51 g (2.9 mmol) of BZMA was used instead of 0.77 g of HEMA, to yield 0.85 g (yield=93%) of a colorless HEMA.BZMA random copolymer.

The Mn of the random copolymer thus obtained was 269,000 (measured by GPC with DMF as the elution solvent), and moreover composition analysis of the polymer by $^1$H-NMR revealed that a molar ratio of HEMA units/BZMA units was 49/51.

Example 12

This example shows the preparation of a diblock copolymer.

Using a reaction vessel 8 the same as that used in example 1, and using the same method as example 1, the air inside the reaction vessel 8 was replaced with argon. Next, while argon was passed through the three way cock 1, 1 ml of dry DMF, 1.04 g (5.9 mmol) of BZMA as the second monomer (M-2-1) and 0.13 g (0.037 mmol of phosphorus atoms) of the polymer solution (P-1-1) prepared in example 2 were added sequentially to the reaction vessel using a syringe.

The temperature of the mixture was raised to 60° C. while stirring, and the reaction mixture was then maintained at this temperature, with stirring, for 6 hours to yield poly-BZMA. Analysis by $^1$H-NMR showed a BZMA polymerization conversion of 90%.

Next, 0.77 g (5.9 mmol) of HEMA as the third monomer (M-2-2), and 4 ml of dry DMF were added to the reaction vessel using a syringe, and the reaction mixture was then stirred for 18 hours with the temperature maintained at 60° C. The resulting reaction mixture was then poured into 150 ml of DEE to precipitate the polymer. The polymer was then separated by filtration and air dried overnight followed by drying under vacuum for 12 hours at room temperature, to yield 1.18 g (yield=64%) of a colorless poly-BZMA.HEMA.diblock copolymer.

The Mn of the diblock copolymer thus obtained was 320,000 (measured by GPC with DMF as the elution solvent), and moreover calculations from the $^1$H-NMR data revealed that a molar ratio of BZMA units/HEMA units was 80/20.

Example 13

This example also shows the preparation of a diblock copolymer.

Using a reaction vessel 8 the same as that used in example 1, and using the same method as example 1, the air inside the reaction vessel 8 was replaced with argon. Next, while argon was passed through the three way cock 1, 3 ml of dry DMF, 2 ml of dry chloroform, 0.99 g (5.9 mmol) of CHMA as the second monomer (M-2-1), and 0.11 g (0.032 mmol of phosphorus atoms) of the polymer solution (P-1-1) prepared in example 2 were added sequentially to the reaction vessel using a syringe.

The temperature of the mixture was raised to 60° C. while stirring, and the reaction mixture was then maintained at this temperature, with stirring, for 24 hours to yield poly-CHMA. Analysis by $^1$H-NMR showed a CHMA polymerization conversion exceeding 90%.

Next, 1.04 g (5.9 mmol) of BZMA as the third monomer (M-2-2), and 3 ml of dry DMF, were added to the reaction vessel using a syringe and the reaction mixture was then stirred for 24 hours with the temperature maintained at 60° C. To this reaction product was added 2 ml of chloroform to give a uniform solution. The solution obtained was poured into 200 ml of n-hexane to precipitate the polymer. The polymer was then separated by filtration and air dried overnight followed by drying under vacuum for 12 hours at room temperature, to yield 1.87 g (yield=91%) of a colorless poly-CHMA.BZMA.diblock copolymer.

The Mn of the diblock copolymer thus obtained was 43,700 (measured by GPC with tetrahydrofuran as the elution solvent), and moreover calculations from the $^1$H-NMR data revealed that a molar ratio of CHMA units/BZMA units was 57/43.

What is claimed is:

1. A process for producing polymers of α,β-unsaturated carboxylic acid esters containing a tertiary amino group comprising: polymerizing essentially only an α,β-unsaturated carboxylic acid ester (M-1) containing a tertiary amino group as a polymerizable monomer, in the presence of a phosphorus compound (A) represented by formula (I):

(I)

wherein X represents a halogen atom and each of $R^1$ and $R^2$ represents an alkyl group, a substituted alkyl group, a cycloalkyl group, a substituted cycloalkyl group, an aryl group, or a substituted aryl group, and $R^1$ and $R^2$ can be either independent of each other or mutually linked to form a divalent organic group.

2. A production process according to claim 1, wherein said α,β-unsaturated carboxylic acid ester (M-1) containing a tertiary amino group, is an α,β-unsaturated carboxylic acid ester which does not have a functional group containing an active hydrogen.

3. A production process according to claim 2, wherein said α,β-unsaturated carboxylic acid ester (M-1) containing a tertiary amino group, is an acrylic acid ester and/or a methacrylic acid ester.

4. A production process according to claim 1, wherein said α,β-unsaturated carboxylic acid ester (M-1) containing a tertiary amino group, is 2-dimethylaminoethyl methacrylate.

5. A production process according to any one of claim 1 through claim 4, wherein said phosphorus compound (A) represented by the formula (I), is chlorodiarylphosphine.

6. A process for producing polymers of α,β-unsaturated carboxylic acid esters comprising: polymerizing an α,β-unsaturated carboxylic acid ester (M-2) using as a polymerization initiator a polymer of an α,β-unsaturated carboxylic acid ester containing a tertiary amino group obtained by the polymerization of an α,β-unsaturated carboxylic acid ester (M-1) containing a tertiary amino group in the presence of a phosphorus compound (A) represented by formula (I):

(I)

wherein X represents a halogen atom and each of $R^1$ and $R^2$ represents an alkyl group, a substituted alkyl group, a cycloalkyl group, a substituted cycloalkyl group, an aryl group, or a substituted aryl group, and $R^1$ and $R^2$ can be either independent of each other or mutually linked to form a divalent organic group.

7. A production process according to claim 6, wherein said α,β-unsaturated carboxylic acid ester (M-1) containing a tertiary amino group, is an α,β-unsaturated carboxylic acid ester which does not have a functional group containing an active hydrogen.

8. A production process according to claim 7, wherein said α,β-unsaturated carboxylic acid ester (M-1) containing a tertiary amino group, is an acrylic acid ester and/or a methacrylic acid ester.

9. A production process according to claim 6, wherein said α,β-unsaturated carboxylic acid ester (M-1) containing a tertiary amino group, is 2-dimethylaminoethyl methacrylate.

10. A production process according to claim 6, wherein said phosphorus compound (A) represented by the formula (I), is chlorodiarylphosphine.

11. A production process according to claim 8, wherein said phosphorus compound (A) represented by the formula (I), is chlorodiarylphosphine.

12. A process for producing polymers of α,β-unsaturated carboxylic acid esters comprising: polymerizing an α,β-unsaturated carboxylic acid ester (M-2) using as a polymerization initiator a polymer of an α,β-unsaturated carboxylic acid ester containing a tertiary amino group (M-1), the polymer having a group represented by formula (II):

(II)

wherein each of $R^1$ and $R^2$ represents an alkyl group, a substituted alkyl group, a cycloalkyl group, a substituted cycloalkyl group, an aryl group, or a substituted aryl group, and $R^1$ and $R^2$ can be either independent of each other or mutually linked to form a divalent organic group.

13. A production process according to claim 12, wherein said α,β-unsaturated carboxylic acid ester (M-1) containing a tertiary amino group, is an α,β-unsaturated carboxylic acid ester which does not have a functional group containing an active hydrogen.

14. A production process according to claim 13, wherein said α,β-unsaturated carboxylic acid ester (M-1) containing a tertiary amino group, is an acrylic acid ester and/or a methacrylic acid ester.

15. A production process according to claim 12, wherein said α,β-unsaturated carboxylic acid ester (M-1) containing a tertiary amino group, is 2-dimethylaminoethyl methacrylate.

16. A production process according to claim 12, wherein said $R^1$ and $R^2$ of the group represented by the formula (II) are independently aryl groups.

17. A production process according to claim 14, wherein said $R^1$ and $R^2$ of the group represented by the formula (II) are independently aryl groups.

18. A process for producing polymers of α,β-unsaturated carboxylic acid esters comprising: polymerization process involving the polymerization of an α,β-unsaturated carboxylic acid ester (M-2) using as a polymerization initiator a compound represented by formula (III):

(III)

wherein each of $R^1$ and $R^2$ represents an alkyl group, a substituted alkyl group, a cycloalkyl group, a substituted cycloalkyl group, an aryl group, or a substituted aryl group, and $R^1$ and $R^2$ can be either independent of each other or mutually linked to form a divalent organic group, $R^3$ represents an N,N,-dialkylaminoalkyl group, $R^4$ represents a hydrogen atom or a methyl group, and n represents 0 or an integer of 1 or greater.

19. A production process according to claim 18, wherein $R^1$ and $R^2$ of the compound represented by said formula (III) are independently aryl groups, $R^3$ is a 2-dimethylaminoethyl group, $R^4$ is a methyl group, and X is a chlorine atom.

20. A production process according to any one of claim 6 through claim 19, wherein, as said α,β-unsaturated carboxylic acid ester (M-2), two or more different ingredients are used, which are selected from the group consisting of α,β-unsaturated carboxylic acid esters and α,β-unsaturated carboxylic acid ester mixtures, which are then sequentially polymerized.

21. A production process according to any one of claim 6 through claim 19, wherein said α,β-unsaturated carboxylic acid ester (M-2) containing a tertiary amino group, is an acrylic acid ester and/or a methacrylic acid ester.

22. A production process according to claim 20, wherein said α,β-unsaturated carboxylic acid ester (M-2), is an acrylic acid ester and/or a methacrylic acid ester.

23. A process for producing polymers of α,β-unsaturated carboxylic acid esters containing a tertiary amino group comprising polymerizing an α,β-unsaturated carboxylic acid ester (M-1) containing a tertiary amino group, in the presence of essentially only a phosphorus compound (A) represented by formula (I) as a catalyst:

(I)

wherein X represents a halogen atom and each of $R^1$ and $R^2$ represents an alkyl group, a substituted alkyl group, a cycloalkyl group, a substituted cycloalkyl group, and aryl group, or a substituted aryl group, and $R^1$ and $R^2$ can be either independent of each other or mutually linked to form a divalent organic group.

24. A production process according to claim 23, wherein said α,β-unsaturated carboxylic acid ester (M-1) containing a tertiary amino group is an α,β-unsaturated carboxylic acid ester which does not have a functional group containing an active hydrogen.

25. A production process according to claim 24, wherein said α,β-unsaturated carboxylic acid ester (M-1) containing a tertiary amino group is an acrylic acid ester and/or methacrylic acid ester.

26. A production process according to claim 23, wherein said α,β-unsaturated carboxylic acid ester (M-1) containing a tertiary amino group is 2-dimethylaminoethyl methacrylate.

27. A production process according to any one of claim 23 through 26, wherein said phosphorus compound (A) represented by formula (I) is chlorodiarylphosphine.

* * * * *